United States Statutory Invention Registration [19]

[11] Reg. Number: H20

Nunn et al. [45] Published: Feb. 4, 1986

[54] VACUUM SLIDE FOR CRIMPED TOW DELIVERY

[75] Inventors: Gary F. Nunn; Thomas H. Watson, both of Summerville, S.C.; James L. Woodley, Jr., Kinston, N.C.

[73] Assignee: E. I. Du Pont de Nemours and Company, Wilmington, Del.

[21] Appl. No.: 605,186

[22] Filed: Apr. 30, 1984

[51] Int. Cl.[4] ..... D02G 1/12
[52] U.S. Cl. ..... 28/263; 28/266
[58] Field of Search ..... 28/263, 264, 265, 266, 28/267

[56] References Cited

U.S. PATENT DOCUMENTS

| | | | |
|---|---|---|---|
| 3,007,225 | 11/1961 | Becker et al. . | |
| 3,078,542 | 2/1963 | McFarren et al. . | |
| 3,108,352 | 10/1963 | Haigler, Jr. et al. . | |
| 3,341,911 | 9/1967 | Smith | 28/266 |
| 3,667,094 | 6/1972 | Yazawa . | |
| 4,221,838 | 9/1980 | Hughes et al. . | |

FOREIGN PATENT DOCUMENTS

| | | | |
|---|---|---|---|
| 703647 | 2/1965 | Canada | 28/266 |
| 4637007 | 10/1971 | Japan | 28/266 |
| 595634 | 12/1947 | United Kingdom | 28/263 |

*Primary Examiner*—S. C. Buczinski
*Assistant Examiner*—Linda J. Wallace

[57] ABSTRACT

The improvement in a tow delivery apparatus downstream of a horizontally oriented stuffing box crimper of an unenclosed smoothly contoured curved perforated surface tangent to and sloping gradually downward away from the outlet end of the crimper to a moving conveyor belt. A vacuum is applied to the perforations in the curved surface at such a level so that the crimped tow is pushed down the curved surface by the tow exiting the crimper.

3 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

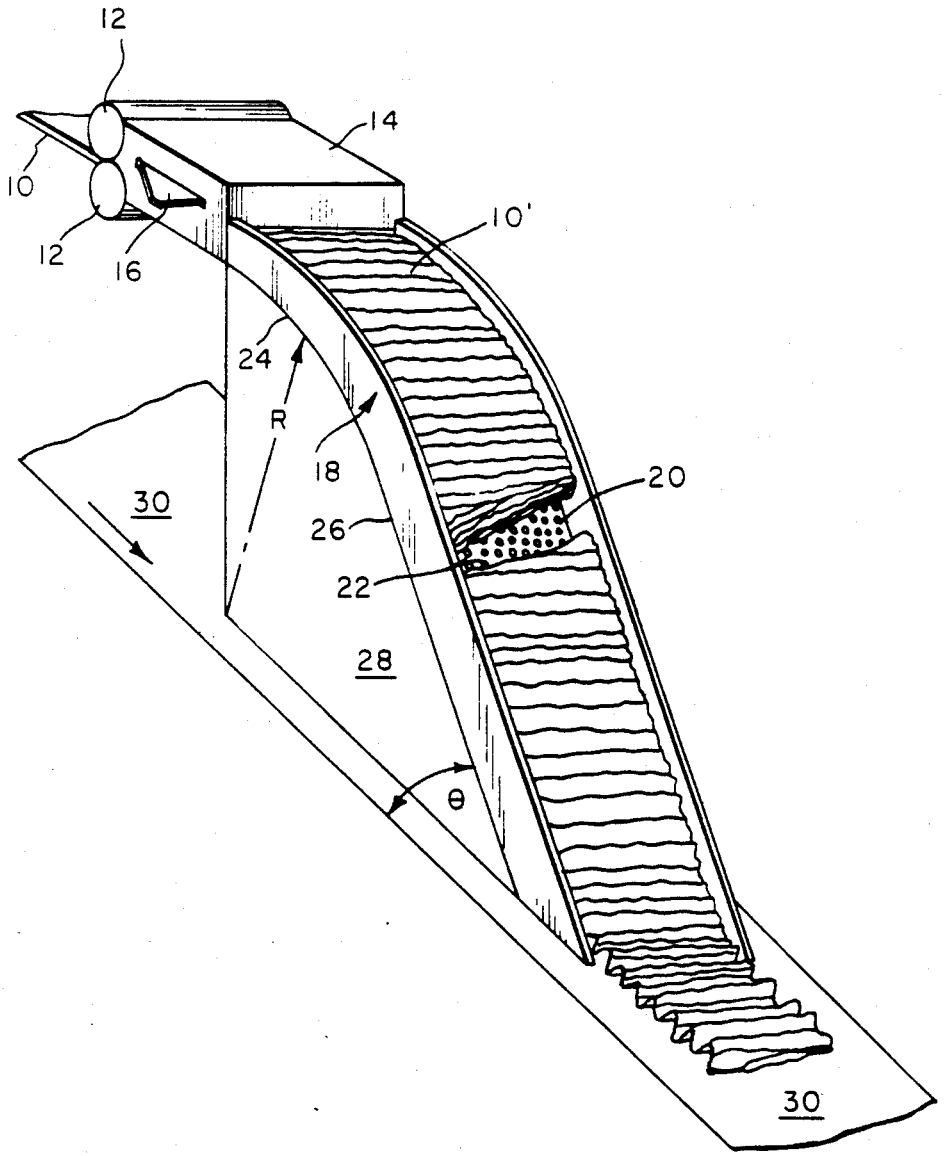
12
14
10
10'
12
16
24
R
18
20
30
26
22
28
θ
30

VACUUM SLIDE FOR CRIMPED TOW DELIVERY

BACKGROUND OF THE INVENTION

This invention relates to an apparatus for conveying crimped tow, and more particularly it relates to an apparatus for vertically conveying a crimped tow without changing the geometry of the crimped tow as imparted in the crimper.

In the manufacture of staple or tow from synthetic polymers, such as polyethylene terephthalate, it is convenient to draw the tow bundle while wet, pass the wet tow through a stuffing box crimper to impart a zig-zag crimp and then lay the tow in a sinuous fashion on a conveyor belt which carries the tow through an oven for drying and heat treating the tow to impart desired combinations of properties. Such a combination frequently employs a chute or box having a "J" configuration commonly called a J-Box to guide the tow from the outlet of the crimper to the conveyor. The percentage of crimp remaining in the tow after transporting it downwardly in a vertical direction in this manner to the conveyor is usually less than that imparted to the tow in the crimper.

SUMMARY OF THE INVENTION

The present invention provides an apparatus for carrying crimped tow away from the crimper to a conveyor without changing tow geometry as it was in the crimper, in other words, without a substantial loss of crimp as imparted to the tow in the crimper. The apparatus comprises an unenclosed, fixed, smoothly contoured, curved, perforated surface sloping gradually downward away from the outlet end of the crimper to substantially meet and terminate at the conveyor. Preferably the curved surface is tangent to and slopes away from the outlet end of the crimper radially and is coupled with a means to apply a level of vacuum to the perforations in the surface.

BRIEF DESCRIPTION OF THE DRAWING

The drawing is a schematic isometric view of apparatus suitable for carrying out the invention.

DETAILED DESCRIPTION OF THE PREFERRED EMBODIMENT

In the drawing, the embodiment chosen for purposes of illustration shows that an uncrimped synthetic fiber multifilament tow 10, usually supplied from a draw machine, is passed through a pair of crimper rolls 12 which force the tow under pressure into the crimping-stuffing-box 14. Pressure in the stuffing-box is adjusted by the tension on the crimper gate 16. From the stuffing-box the crimped tow 10' passes to chute 18 which directs the crimped tow to a conveyor belt 30. The chute 18 is unenclosed and comprises a smoothly curved bottom surface 20 having perforations 22 throughout its length. The perforations ideally extend to within one inch (25.4 mm) of the outlet end of the stuffing-box 14. In a preferred embodiment the perforations were 0.12 inch (3 mm) in diameter on 0.20 inch (5 mm) centers providing about 33 percent free area.

The surface 20 comprises two portions; the first portion 24 is smoothly curved starting tangent to the outlet in a radius R of about 64 inches (1610 mm) followed by a second portion 26 which is straight and inclined to the horizontal surface of belt 30 at an angle $\theta$ of about 46 degrees. A plenum chamber 28 encloses the underside of the chute 18 and is connected to a source of vacuum (not shown) for drawing vacuum on the perforations 22.

In operation, a vacuum is applied to perforations 22 through plenum chamber 28 at a sufficiently high level so that crimped tow 10' is actually pushed down the chute 18 to the conveyor by fiber exiting the crimper-stuffing-box 14. In this manner, the crimped tow 10' is moved from the crimper to the conveyor without changing tow geometry as it was in the crimper.

We claim:

1. In a tow processing apparatus including a horizontally oriented stuffing-box crimper having crimper rolls to feed tow to the crimper and a horizontally oriented moving conveyor belt located below the outlet end of the crimper to carry the crimped tow away from the crimper, an apparatus to carry the crimped tow from the crimper to the moving conveyor belt without changing tow geometry comprising: an unenclosed fixed smoothly contoured, curved perforated surface sloping gradually away from the outlet end of the crimper to substantially meet and terminate at the conveyor belt; and means to apply vacuum to said perforations.

2. The apparatus as defined in claim 1, said curved surface being tangent to and sloping away from the outlet end of the crimper at a radius of about 64 inches.

3. The apparatus of claims 1 or 2, said perforations extending to within one inch of the outlet end of the crimper and providing about 33 percent free area.

* * * * *